United States Patent [19]

Montgomery

[11] 4,288,328
[45] Sep. 8, 1981

[54] USE OF SPECIALLY PREPARED IRON FLOC TO OXIDIZE AND REMOVE IRON IN WATER TREATMENT PROCESSES

[75] Inventor: John R. Montgomery, Tuscaloosa, Ala.

[73] Assignee: Iron Removal Specialists, Inc., Tuscaloosa, Ala.

[21] Appl. No.: 211,095

[22] Filed: Nov. 28, 1980

Related U.S. Application Data

[63] Continuation-in-part of Ser. No. 45,609, Jul. 19, 1979, abandoned.

[51] Int. Cl.³ .......................... C02F 1/52; C02F 1/76
[52] U.S. Cl. ................................ 210/713; 210/714; 210/718; 210/722; 210/724; 210/754
[58] Field of Search ............... 210/702, 713, 714, 717, 210/718, 721, 722, 723–728, 738, 754–756, 912

[56] References Cited

U.S. PATENT DOCUMENTS

| | | | |
|---|---|---|---|
| 3,097,163 | 7/1963 | Riddick | 210/726 |
| 3,377,272 | 4/1968 | Cann | 210/711 |
| 3,617,559 | 11/1971 | Cywin | 210/722 |
| 3,681,238 | 8/1972 | Emmett | 210/722 |
| 3,738,932 | 6/1973 | Kostenbader | 210/713 |
| 4,049,545 | 9/1977 | Horvath | 210/724 |

FOREIGN PATENT DOCUMENTS 276811  10/1970  U.S.S.R. ................... 210/723

*Primary Examiner*—Peter A. Hruskoci
*Attorney, Agent, or Firm*—Isaac P. Espy

[57] ABSTRACT

Ground water containing ferrous compounds is first treated with aluminum sulfate before aeration followed by lime addition after aeration to produce an iron-aluminum sludge possessing an oxidative capacity. Portions of the sludge are recycled back to utilize the oxidative capacity of the sludge. Chlorine is added after the oxidative capacity of the sludge has been utilized. An improved oxidation and removal of iron is obtained, yielding a treated water low in iron content with decreased requirements for chlorine.

3 Claims, 1 Drawing Figure

USE OF SPECIALLY PREPARED IRON FLOC TO OXIDIZE AND REMOVE IRON IN WATER TREATMENT PROCESSES

STATUS OF ORIGINAL APPLICATION

This is a continuation-in-part of a copending parent application, Ser. No. 045,609, filed July 19, 1979, now abandoned.

BACKGROUND OF THE INVENTION

Raw water from ground water sources very often contains iron in the form of soluble ferrous compounds. Its presence causes numbers of undesirable effects, such as taste, staining, and pipe encrustation. Because of this, the acceptable limit in drinking water is set at 0.3 mg/l.

Typical water treatment plants, producing potable water from raw water containing ferrous iron, have the following treatment steps: (a) aeration, (b) the mixing of chemicals such as one or more of lime, potassium-permanganate, and chlorine, (c) slow agitation and formation of oxidized iron in floc particles, (d) sedimentation and removal of precipitated floc as "sludge," and (e) filtration of the supernatant water.

The purpose of the steps in the typical plant and how it removes iron, can be briefly described. Aeration drives off gases which, when dissolved, are acidic; for example, carbon dioxide. This tends to raise the pH of the water. In general, the ultimate formation of precipitated floc is enhanced by elevated pH. The addition of lime, in the form of calcium hydroxide, further raises the pH and a coagulative process occurs as the ferrous compound reacts with the calcium compound, oxidizing the ferrous compound into a flox containing ferric hydroxide. The flocculation time allows building of floc particles to sizes which precipitate rapidly. In the typical plant the sedimentation of floc, or sludge, is dewatered and disposed of.

The present invention differs from conventional treatment in that alum is added to the raw water prior to aeration, and a portion of the sludge is recycled into the upstream process. Lime is added and a detention time is provided so that there is sufficient contact between the above steps and the addition of chlorine in the flocculation tank. I have found that using the alum, prior to aeration, and recycling the sludge, drastically reduces the need for chlorine; however, iron oxidation and removal is enhanced. Thus I have discovered a process which takes less chemicals (and cost) and does a more effective job of iron removal than was previously possible.

Horvath U.S. Pat. No. 4,049,545 disclosed a process of treating "waste water," as he defined the term, by using recycled sludge with alkaline and acidic coagulant aids and precipitants. However, Horvath's invention appears directed to wastes having extremely high solids content and "enormous" bacterial populations (col. 1, lines 23-30). For example, Horvath's first example deals with total solids in the range of 700 mg/l; his second example deals with total solids of 365 mg/l. Total dissolved solids in the second example are reduced only from 272 to 268 mg/l; and initial iron content was only 0.1 mg/l. Removal of suspended solids appears to be the major objective in Horvath; in my invention, the narrow purpose is the removal of dissolved ferrous compounds. Aeration is not used in Horvath's method. Horvath's recycling is taught as an economical coagulant aid; my invention teaches its effectiveness in oxidation and removal of iron.

Cywin U.S. Pat. No. 3,617,559 taught the addition of a "neutralizing agent" into dilute acid waste water; either prior to aeration or partly after aeration (col. 4, line 6). This teaches away from my invention since alum tends to decrease the pH rather than raise it in neutralization. His teaching of splitting part of the agent after aeration also contradicts the teaching of my process. Cywin is concerned principally with neutralization; my invention is concerned with iron removal. Cywin indicates recycling of sludge is well known (col. 2, line 44) in order to increase precipitation. My discovery is, that in combination with pre-aeration addition of alum, there is enhanced oxidation and removal of iron in the ferric state.

Emmett U.S. Pat. No. 3,681,238 teaches the use of alum in stabilizing oil field water wastes, but shows its introduction during and after aeration; unlike my discovery. Emmett teaches the use of alum to coagulate for removal prior to filtration; the use of alum in my invention is to enhance oxidation and removal of iron.

Kostenbader U.S. Pat No. 3,738,932 teaches a method of neutralizing acid mine wastes by injecting alkaline compounds and recycling sludge. But his teaching is away from the present invention in that he, for example, attempts to rid an acid waste of aluminum sulfate (for one example), while my invention teaches the introduction of aluminum sulfate and in a manner which acidizes the raw water.

BRIEF SUMMARY OF THE INVENTION

It is an object of the present invention to provide a treatment process for iron-bearing waters which uses small amounts of low cost chemicals added in a preferred order and recycle of the precipitated sludge. Oxidation of iron is promoted, thereby reducing the dosage requirements for strong oxidants to produce a finished water suitable for potable use.

I have found that the addition of aluminum sulfate (alum) given by the formula, $Al_2(SO_4)_3 \cdot xH_2O$ (where x represents an unknown exact value but is often quoted as 14.3), before aeration, followed after aeration by the addition of an alkali such as lime and recycle of the settled, hydrous iron-aluminum floc to the water after aeration produces an improved oxidation and removal of iron whereby the requirements for a strong oxidant such as chlorine is reduced by as much as 50 percent.

The preferred order of chemical addition is alum, lime, recycled sludge, chlorine. The alum is added before aeration in the dosage range of 1 to 50 mg/l as $Al_2(SO_4)_3 \cdot xH_2O$. The lime dosage varies with the carbon dioxide and alkalinity content of the water and is used to adjust the pH of the treated water in the approximate range of 7 to 9. It is preferably added in a rapid mix tank. Commonly found lime dosages for ground waters are in the range of 5 to 100 mg/l as $Ca(OH)_2$. The range in percent by volume (recycle ratios) of recycled sludge varies from 2 to 30 percent. It was found that the optimum sludge recycle ratios varied with the iron content of water from 5 percent for a water containing 5 mg/l of iron to 21 percent for a water containing 17 mg/l of iron. The optimum percent solids in the recycled sludge was found to be in the range of 0.1 to 0.5 percent solids by weight. A comparison of the analyses of the sludges with their iron oxidative capacity showed that elemental iron to aluminum ratios of 15.7 to 57.3 produced the best results. Chlorine is added last and after a detention or contact time sufficient for the full oxidative power of the sludge and before addition of chlorine varied from 5 minutes for a water containing 5 mg/l of iron to 15 minutes for a water containing 17 mg/l of iron or about one minute per mg/l of iron was required.

Hence, it is an object of this invention to oxidize the iron in ironbearing waters.

It is a further object of this invention to produce an iron-aluminum sludge with elemental iron to aluminum ratios in the range of 15.7 to 57.3 possessing an oxidizing capacity such that the requirements for additional oxidants are reduced.

It is a specific object of this invention to produce an improved process for the oxidation and subsequent removal of iron contained in water.

The invention may be more clearly understood by reference to the accompanying drawing shown in FIG. 1.

DETAILED DESCRIPTION OF THE INVENTION

Figure 1:
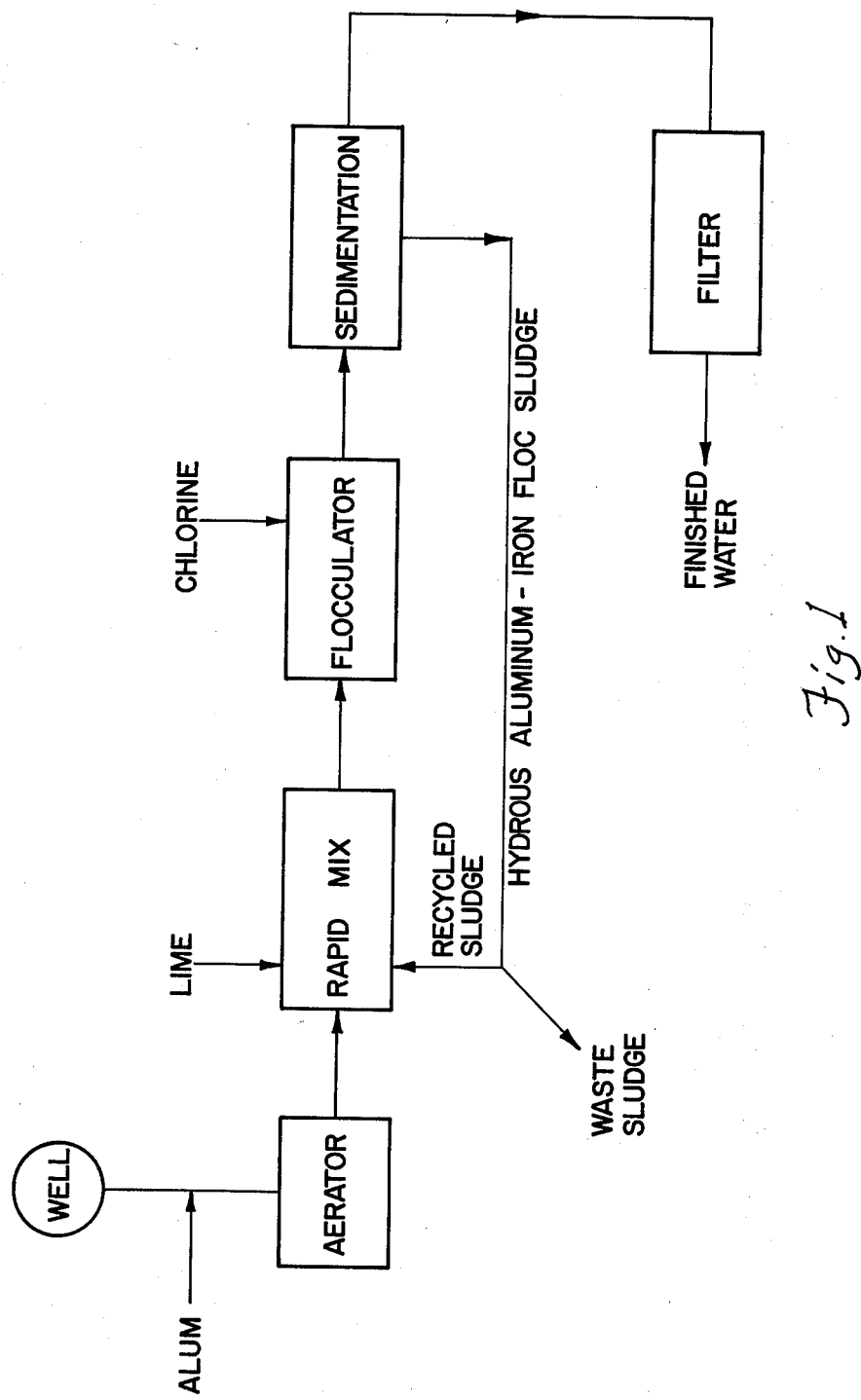

Referring to FIG. 1, alum is added in solution form to dose the ground water to contain approximately 1 to 50 mg/l.

Alum is added to the ground water prior to aeration by the aerator shown. Aeration should bring air in intimate contact with the water to remove dissolved gases, such as $CO_2$ and $H_2S$, and add oxygen to the water. Lime is next added, preferably in the rapid mix tank in the range of 5 to 100 mg/l as $Ca(OH)_2$ to adjust the pH to the approximate range of 7 to 9. Recycled sludge from the sedimentation tank is next added either prior to or in the rapid mix tank or in the beginning of the flocculating basin, or preferably, in a separate detention or oxidizer tank in the range of 2 to 30 percent by volume of the treated water.

The place and order in which the recycled sludge is added must be chosen so that the recycled sludge is detained in the water a length of time sufficient to utilize fully the oxidative capacity of the recycled hydrous aluminum-iron floc sludge prior to the addition of chlorine. The detention of lime is not critical, since I have found that it does not contribute to the oxidative capacity. In the drawing, detention is accomplished by volume-velocity adjustment of the vessels, conduits or equipment shown in diagrammatic form; in practice it may be preferable to use a separate detention or oxidizer tank in series. The sludge solids concentration is normally in the range of 0.1 to 0.5 percent by weight. Chlorine is next added in a point in the flocculator such that a prior contact time of recycled sludge and water of 5 15 minutes has elapsed, or about 1 minute per mg/l of iron in the ground water. Chlorine is added to produce a final concentration of about 0.5 mg/l or more for final oxidation and disinfection. The treated water is flocculated, preferably in a slowly agitated flocculator tank, settled in a sedimentation tank, and filtered in a conventional process. Following application of this invention, a finished water is produced containing a total iron concentration of 0.30 mg/l or less to meet the currently stated standards for potable water supplies.

It is well known to recycle previously precipitated or settled solids back into a precipitation or reaction vessel in order to "seed" a reaction or to furnish a precipitation nuclei. This present invention differs from the prior art in that an improved iron oxidation is obtained on the recycle of the settled solids or sludge.

A laboratory example is used to explain my process: a ground water containing 5.5 mg/l ferrous iron was first treated in a conventional manner in the order of alum at 10 mg/l, chlorine at 6.0 mg/l, sludge at 5 percent by volume and lime at 35 mg/l. The analysis of the water after a 5 minute slow mix and 5 minute settling time showed a chlorine residual of 0.05 mg/l and a total iron of 2.5 mg/l. By contrast, the same water treated according to this invention in the order of alum at 10 mg/l before aeration, lime at 35 mg/l, sludge at 5 percent by volume, and chlorine at 6.0 mg/l after a 5-minute time interval followed by the above mixing and settling times produced a final chlorine residual of 3.2 mg/l and a total iron concentration of 1.4 mg/l. Thus the iron oxidative capacity not only increased from 2.3 to 4.1 mg/l of iron oxidized but the chlorine required decreased from 5.95 to 2.8 mg/l. For a 4 million gallon per day plant, this would result in a savings of about $5,800 annually based on 1980 prices.

Application of iron sludge alone without the addition of alum did not produce the desired final iron concentration and it is an essential part of this invention that chemicals added in the order of alum prior to aeration, lime, sludge and chlorine. The order of insertion of lime and sludge does not appear to be critical, but there must be a detention or contact time between the addition of recycled sludge, and the addition of chlorine. This detention time is necessary in order that the full benefits of its presence is felt prior to the addition of chlorine, which, under this invention, can be decreased over prior treatment processes. Analysis of iron sludges that produced increased oxidative powers showed that aluminum was present in the range of 29.6 to 179 mg/l as Al, iron was present in the range of 1695 to 2813 mg/l Fe with the iron to aluminum ratios varying from 15.7 to 57.3.

In order to study the effect that the different elements contained in the sludge might have on the oxidation and removal of iron, a synthetic sludge was prepared to correpond as closely as possible to that found in our laboratory experiments. Additional synthetic sludges were prepared omitting one or more of the elements. The sludges were then tested for iron oxidation and removal. While it was found that copper, manganese, silicon, and nickel all affected iron removal, the most significant effect was produced by aluminum. This is shown by the following results by comparing iron removals obtained with and without aluminum as aluminum sulfate in the sludge:

| Alum as $Al_2(SO_4)_3 \cdot X\ H_2O$ mg/l | % Iron Removal |
| --- | --- |
| 53 | 95 |
| 15 | 92 |
| 0 | 65 |

Photomicrographs in the range of 100× to 1000× magnification show the sludge material to be typical hydrous, metallic floc and did not reveal crystalline structures; which supports ruling out the phenomena of crystal seeding as the removal mechanism for iron sludge recycle. Measurements of the floc size show that sludge possessing good iron oxidative capacity has floc particles of about the same size, ranging from 13 to 17 micrometers ($\mu$m). By contrast sludge with iron to aluminum ratios of less than 15.7, that do not possess good iron oxidative capacity, has floc particles sizes about one-fourth of the above stated sizes. The structure of hydrous aluminum and iron oxides is not well understood but it is the belief of the inventor that it is the iron-aluminum chemical forms produced in the present invention rather than a production of a "seed" nuclei that is responsible for the oxidative capacity of the sludge that is presently demonstrated. The effective sludge produced by my invention can be known as hydrous aluminum-iron floc sludge.

Treatment of ground waters with varying iron content showed that the optimal sludge recycle percent varied directly as the iron content.

For best results, sufficient time should be allowed between contact of the water with recycled sludge and application of chlorine in order that the oxidative power of the recycled sludge be utilized to the fullest.

What I claim is:

1. A process for treating water containing ferrous compounds comprising the following steps:
   (a) a first step of adding approximately 1 to 50 mg/l of alum to the untreated water;
   (b) a second step of aerating the water by intimate contact with air to remove dissolved gases and add oxygen to the water and to oxidize said ferrous compounds into iron oxides;
   (c) a further step of adding lime to the water to adjust the pH of the water to a value approximately from 7 to 9;
   (d) a further step of adding to the water recycled hydrous aluminum-iron floc sludge, collected in step (h) to produce a water to sludge ratio of about 2 to 30 percent by volume, said hydrous aluminum-iron floc sludge having an iron to aluminum ratio in the range of 15.7–57.3 by weight;
   (e) a further step of detention of the water for a time, after steps (a)–(d), and prior to the addition of chlorine in step (f) said detention time being effective in forming said hydrous aluminum-iron floc sludge including said iron oxides;
   (f) a further step of addition of chlorine to the water to produce a final concentration of at least about 0.5 mg/l;
   (g) a further step of separating the hydrous aluminum-iron floc sludge, formed in the prior steps, from the treated water; and
   (h) collecting the hydrous aluminum-iron floc sludge and recycling a part thereof for use in step (d).

2. The process of claim 1 wherein the detention time of step (e) equals about one minute per mg/l of ferrous iron in the untreated water.

3. The process of claim 1 wherein the alum has the approximate formula $Al_2(SO_4)_3 \cdot 14.3\ H_2O$.

* * * * *